United States Patent
Yang

(10) Patent No.: US 7,489,529 B2
(45) Date of Patent: Feb. 10, 2009

(54) CONTROL CIRCUIT HAVING FREQUENCY MODULATION TO REDUCE EMI OF POWER CONVERTERS

(75) Inventor: Ta-yung Yang, Milpitas, CA (US)

(73) Assignee: System General Corp., Taipei Hsien (TW)

( * ) Notice: Subject to any disclaimer, the term of this patent is extended or adjusted under 35 U.S.C. 154(b) by 115 days.

(21) Appl. No.: 11/269,973

(22) Filed: Nov. 8, 2005

(65) Prior Publication Data

US 2007/0103137 A1    May 10, 2007

(51) Int. Cl.
*H02M 1/12* (2006.01)
(52) U.S. Cl. .................. 363/40; 363/39; 363/21.13; 363/21.17
(58) Field of Classification Search ............ 363/40, 363/39, 21.13, 21.17
See application file for complete search history.

(56) References Cited

U.S. PATENT DOCUMENTS

| | | | |
|---|---|---|---|
| 3,971,972 A * | 7/1976 | Stich | 318/811 |
| 6,014,063 A * | 1/2000 | Liu et al. | 331/78 |
| 6,229,366 B1 | 5/2001 | Balakirshnan et al. | 327/172 |
| 6,249,876 B1 | 6/2001 | Balakrishnan et al. | 713/501 |
| 7,061,780 B2 * | 6/2006 | Yang et al. | 363/21.16 |

OTHER PUBLICATIONS

"Reduction of Power Supply EMI Emission by Switching Frequency Modulation" Feng Lin et al. / IEEE Transactions on Power Electronics, vol. 9, No. 1, Jan. 1994 / pp. 132-137.
"Effects of Switching Frequency Modulation on EMI Performance of a Converter Using Spread Spectrum Approach" M. Rahkala et al. / Applied Power Electronics Conference and Exposition, 2002, 17-Annual, IEEE, vol. 1 / pp. 93-99.

* cited by examiner

*Primary Examiner*—Akm E Ullah
*Assistant Examiner*—Nguyen Tran
(74) *Attorney, Agent, or Firm*—J.C. Patents

(57) ABSTRACT

A control circuit having frequency modulation is used for reducing the EMI of a power converter. A switching circuit is couple to a feedback circuit to generate a switching signal for regulating an output of the power converter. A first oscillator is equipped to determine a switching frequency of the switching signal. A second oscillator is coupled to the first oscillator to modulate the switching frequency of the switching signal for reduce the EMI of the power converter. A programmable resistor is designed to attenuate the feedback signal of the feedback circuit. The resistance of the programmable resistor is controlled by the output of the second oscillator. Therefore, the output power and the output voltage can be kept constant when the switching frequency is modulated.

10 Claims, 5 Drawing Sheets

CONTROL CIRCUIT HAVING FREQUENCY MODULATION TO REDUCE EMI OF POWER CONVERTERS

BACKGROUND OF THE INVENTION

1. Field of the Invention

The present invention relates to a power converter, and more specifically relates to the control of a switching mode power converter.

2. Description of the Related Art

Power converters have been used to convert an unregulated power source to a regulated voltage or current. FIG. 1 shows a traditional power converter. A control circuit 10 generates a switching signal $V_{SW}$ for switching a transformer 30 via a transistor 20. A resistor 40 is applied to sense a switching current $I_P$ of the transformer 30 for switching control. A resistor 45 is equipped to determine a switching frequency of the control circuit 10. A terminal FB of the control circuit 10 is connected to an output of a feedback circuit 50. The feedback circuit 50 is further coupled to an output of the power converter for generating a feedback signal $V_{FB}$. According to the feedback signal $V_{FB}$, the duty cycle of the switching signal $V_{SW}$ determines the power delivered from an input of a power source to an output of the power converter. Although the switching technology reduces the size of the power converter, switching devices generate electric and magnetic interference (EMI) that interferes the power source and environment. The EMI solutions, such as the EMI filter, the transformer shielding etc., are thus required to equip in the power converter for reducing the EMI. However, such EMI solution inevitably causes power consumption and increases the cost and the size of the power converter. In recent development, many prior arts have been proposed to reduce the EMI by using frequency modulation or frequency hopping. For example, "Reduction of Power Supply EMI Emission by Switching Frequency Modulation" by Feng Lin and Dan Y. Chen, IEEE Transactions on Power Electronics, VOL. 9. No. 1. January 1994. "Effects of Switching Frequency Modulation on EMI Performance of a Converter Using Spread Spectrum Approach" by M. Rahkala, T. Suntio, K. Kalliomaki, APEC 2002 (Applied Power Electronics Conference and Exposition, 2002), 17-Annual, IEEE, Volume 1, 10-14, March, 2002, Pages: 93-99. "Offline Converter with Integrated Softstart and Frequency Jitter" by Balu Balakirshnan, Alex Djenguerian, U.S. Pat. No. 6,229,366, May 8, 2001; and "Frequency Jittering Control for Varying the Switching Frequency of a Power Supply" by Balu Balakirshnan, Alex Djenguerian, U.S. Pat. No. 6,249,876, Jun. 19, 2001. However, the disadvantage of the prior art is that frequency modulation generates undesirable ripple signal at the output of the power converter. The undesirable ripple signal generated by frequency modulation could be realized by the following description. An output power $P_O$ of the power converter is the product of an output voltage $V_O$ and an output current $I_O$ of the power converter, which is given by, $$P_O = V_O \times I_O = \eta \times P_{IN} \quad (1)$$

An input power $P_{IN}$ of the transformer 30 and the switching current $I_P$ can be respectively expressed by, $$P_{IN} = \frac{1}{2 \times T} \times L_P \times I_P^2$$

$$I_P = \frac{V_{IN}}{L_P} \times T_{ON}$$

Where $\eta$ is the efficiency of the transformer 30; $V_{IN}$ is an input voltage of the transformer 30; $L_P$ is a primary inductance of the transformer 30; T is a switching period of the switching signal $V_{SW}$; $T_{ON}$ is an on-time of the switching signal $V_{SW}$. The equation (1) can be rewritten as, $$P_O = \eta \times \frac{V_{IN}^2 \times T_{ON}^2}{2 \times L_P \times T} \quad (2)$$

The switching period T varies in response to frequency modulation. As shown in equation (2), the output power $P_O$ will vary as the switching period T varies. Therefore, an undesirable ripple signal will be generated as the output power $P_O$ varies.

Another disadvantage of prior art is an unpredictable range of the frequency modulation, which is correlated to the setting of the switching frequency. This would decrease the effect of the EMI reduction when the switching frequency is programmed in response to various application needs.

An object of the present invention is to provide a method and circuit of switching frequency modulation to reduce the EMI for a power converter. Different from prior arts, the present invention will not generate the undesired ripple signal at the output of the power converter. Another object of the present invention is to develop a frequency modulation unrelated to the setting of the switching frequency of the power converter.

SUMMARY OF THE INVENTION

A control circuit having frequency modulation for power converters according to the present invention includes a switching circuit couple to a feedback circuit to generate a switching signal for regulating an output of the power converter. The feedback circuit receives the output of the power converter for producing a feedback signal to control the switching signal. An output of a first oscillator is coupled to the switching circuit to determine a switching frequency of the switching signal. A second oscillator is coupled to the first oscillator to modulate the switching frequency of the switching signal for reducing the EMI of the power converter. A programmable resistor is used to attenuate the feedback signal of the feedback circuit. An output of the second oscillator is further coupled to control a resistance of the programmable resistor. Therefore, the output power and the output voltage can be kept constant when the switching frequency is modulated.

It is to be understood that both the foregoing general descriptions and the following detailed descriptions are exemplary, and are intended to provide further explanation of the invention as claimed. Still further objects and advantages will become apparent from a consideration of the ensuing description and drawings.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

DESCRIPTION OF THE EMBODIMENTS

Figure 1:
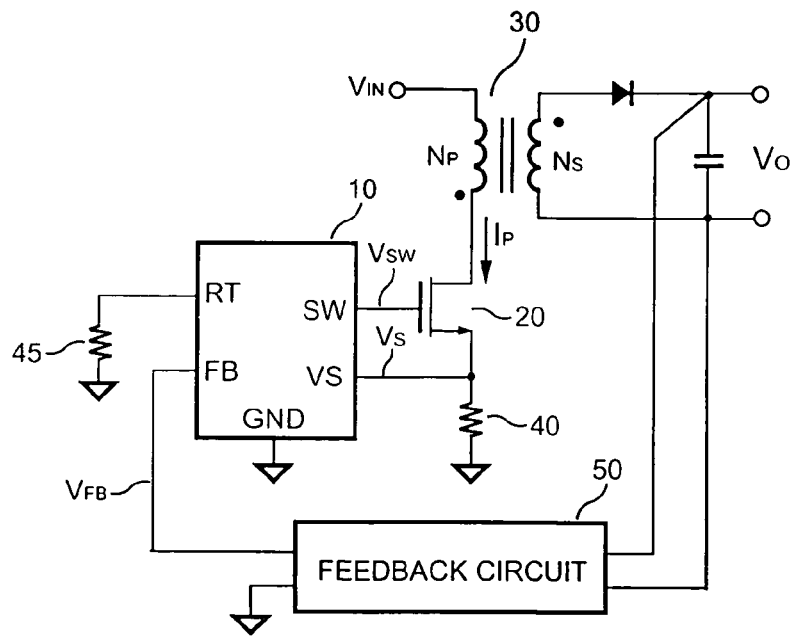
FIG. 1 shows a traditional power converter.

FIG. 1 shows a traditional power converter. A control circuit 10 is coupled to the feedback circuit 50 to generate a switching signal $V_{SW}$ for regulating an output of the power converter. The switching signal $V_{SW}$ is produced in response to a feedback signal $V_{FB}$. The feedback circuit 50 is coupled to the output of the power converter to produce the feedback signal $V_{FB}$. A switching current $I_P$ of a transformer 30 is converted to a switching-current signal $V_S$ via a sense resistor 40. The switching-current signal $V_S$ is provided to the control circuit 10 for producing the switching signal $V_{SW}$.

Figure 2:
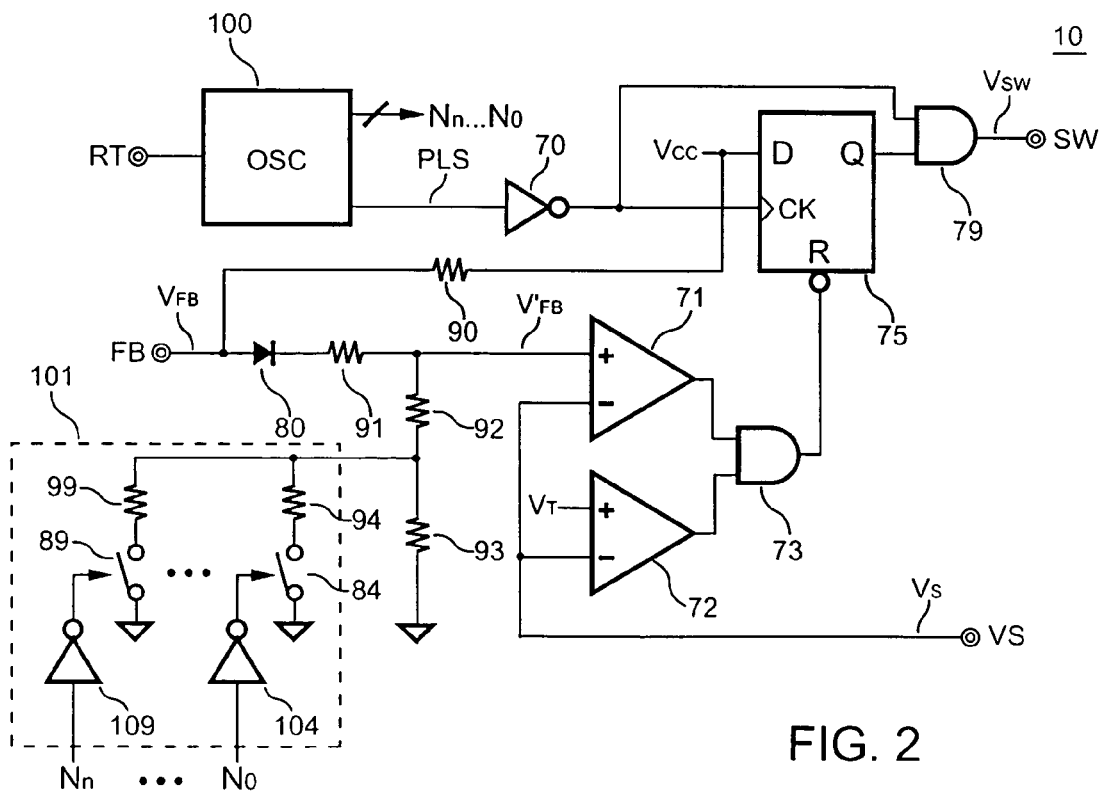
FIG. 2 shows a control circuit according to an embodiment of the present invention.

FIG. 2 shows the control circuit 10 according to an embodiment of the present invention. Comparators 71, 72, a flip-flop 75, an inverter 70, AND gates 73, 79, a diode 80 and resistors 90, 91, 92, 93 form a switching circuit. The resistor 90 is connected to pull high a terminal FB. The feedback signal $V_{FB}$ is coupled to the resistor 91 via the diode 80. The diode 80 provides a level shift for the feedback signal $V_{FB}$. The resistors 91, 92, 93 further attenuate the feedback signal $V_{FB}$ to reduce the loop gain and stabilize the feedback loop of the power converter. The resistor 92 is connected from the resistor 91 to the resistor 93. The resistor 93 is further connected to a ground reference level. The join of the resistors 91, 92 provides an attenuated feedback voltage $V_{FB}'$ to a positive input of the comparator 71. A negative input of the comparator 71 is supplied with the switching-current signal $V_S$. Through the AND gate 73, an output of the comparator 71 is coupled to reset the flip-flop 75. The switching-current signal $V_S$ is further supplied to a negative input of the comparator 72. A positive input of the comparator 72 is supplied with a threshold voltage $V_T$. An output of the comparator 72 is also utilized to reset the flip-flop 75 through the AND gate 73. A clock signal PLS is used to activate the flip-flop 75 via the inverter 70. An output of the inverter 70 is further connected to an input of the AND gate 79. Another input of the AND gate 79 is connected to an output of the flip-flop 75. An output of the AND 79 generates the switching signal $V_{SW}$. Therefore, the switching signal $V_{SW}$ is turned on in response to the clocking of the clock signal PLS. The switching signal $V_{SW}$ is turned off as long as the switching-current signal $V_S$ is higher than the attenuated feedback voltage $V_{FB}'$ and/or the threshold voltage $V_T$.

The oscillator 100 generates the clock signal PLS and digital signals $N_n \ldots N_0$. The terminal RT is connected from the oscillator 100 to the resistor 45 to determine the oscillation frequency of the clock signal PLS. A programmable resistor 101 is connected to the resistor 93 in parallel for programming an attenuation rate of the feedback signal $V_{FB}$. The programmable resistor 101 comprises switching-resistor couples connected to each other in parallel, in which the switching-resistor couples are formed by resistors 99 . . . 94 and switches 89 . . . 84. The switch 84 and the resistor 94 are connected in series. The switch 89 and the resistor 99 are connected in series. The digital signals $N_n \ldots N_0$ control switches 89 . . . 84 through inverters 109 . . . 104 to vary the resistance of the programmable resistor 101.

Figure 3:
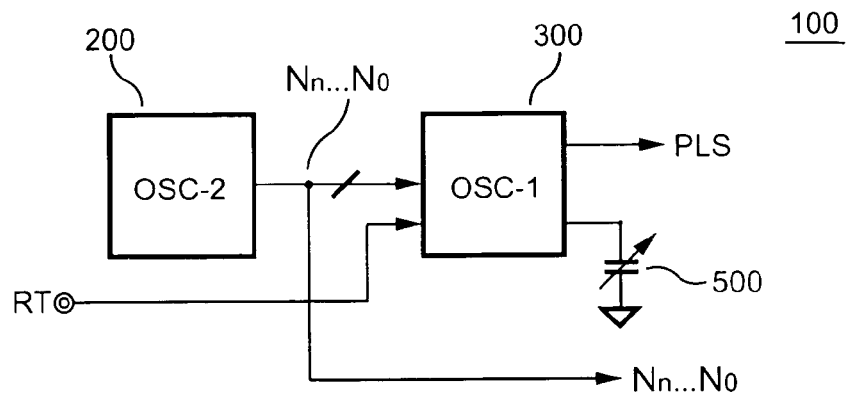
FIG. 3 shows a block diagram of an oscillator of the present invention.
Figure 4:
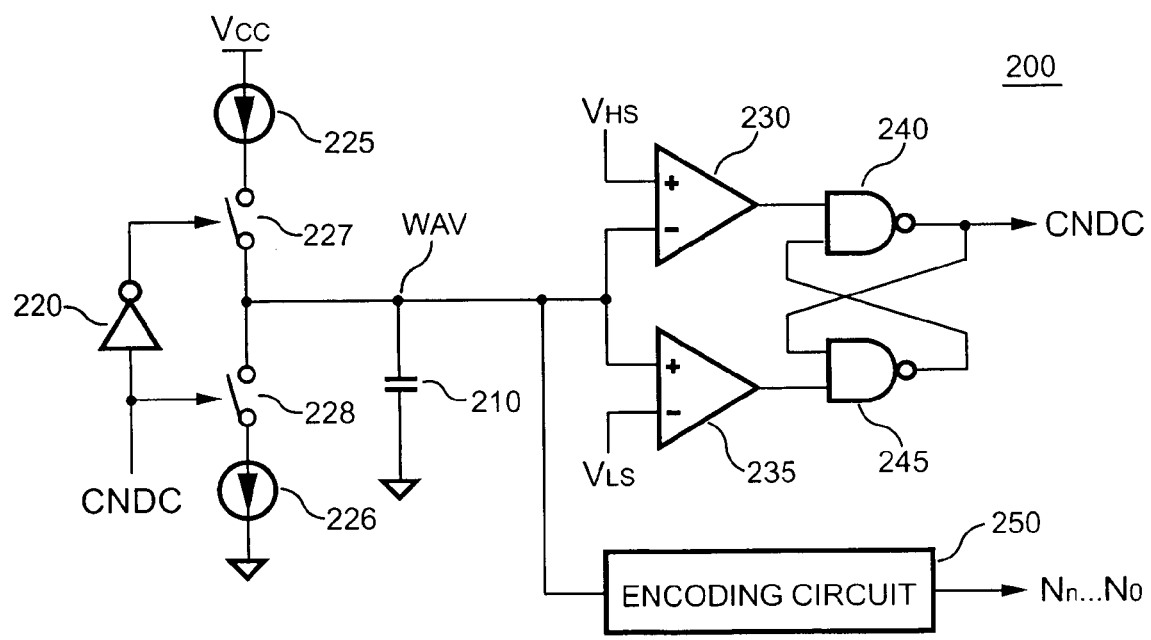
FIG. 4 shows a second oscillator according to an embodiment of the present invention.

The oscillator 100 includes a first oscillator 300 and a second oscillator 200 as shown in FIG. 3. The first oscillator 300 generates the clock signal PLS, and the second oscillator generates digital signals $N_n \ldots N_0$. The terminal RT is connected to the first oscillator 300. FIG. 4 shows the second oscillator 200 according to an embodiment of the present invention. The second oscillation circuit 200 comprises a current source 225 for producing a charge current. A current source 226 produces a discharge current. A switch 227 is connected between the current source 225 and a capacitor 210. A switch 228 is connected between current source 226 and the capacitor 210. An oscillation signal WAV is generated across the capacitor 210. A comparator 230 having a first input is supplied with a threshold voltage $V_{HS}$. A second input of the comparator 230 is connected to the capacitor 210. A comparator 235 having a second input is supplied with a threshold voltage $V_{LS}$. A first input of the comparator 235 is connected to the capacitor 210. The threshold voltage $V_{HS}$ is higher than the threshold voltage $V_{LS}$. A NAND gate 240 having a first input is driven by an output of the comparator 230. An output of the NAND gate 240 drives an inverter 220 and turns on/off the switch 228. An output of the inverter 220 turns on/off the switch 227. A NAND gate 245 having two inputs are respectively connected to the output of the NAND gate 240 and an output of the comparator 235. An output of the NAND gate 245 is connected to a second input of the NAND gate 240. An encoding circuit 250 is utilized to generate the digital signals $N_n \ldots N_0$ in response to the oscillation signal WAV.

Figure 5:
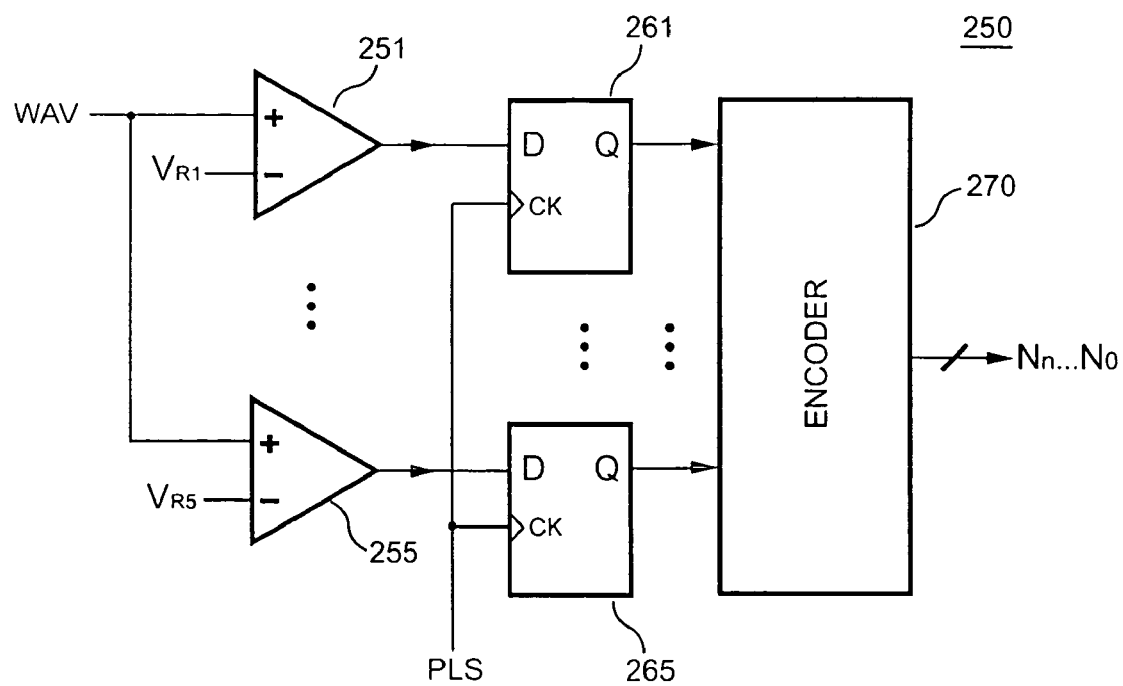
FIG. 5 shows an encoding circuit according to an embodiment of the present invention.
Figure 6:
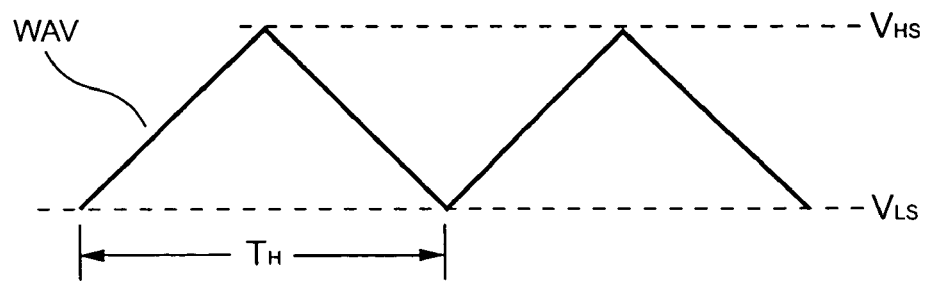
FIG. 6 shows a waveform of an oscillation signal of the second oscillator.

FIG. 5 shows the encoding circuit 250 according to an embodiment of the present invention. The encoding circuit 250 operates as an analog-to-digital converter. The encoding circuit 250 includes comparators 251 . . . 255. The comparators 251 . . . 255 having positive inputs are supplied with the oscillation signal WAV. The negative inputs of comparators 251 . . . 255 are supplied with threshold voltages $V_{R1} \ldots V_{R5}$ respectively. Flip-flops 261 . . . 265 having inputs are coupled to the outputs of comparators 251 . . . 255 respectively. The clock inputs of flip-flops 261 . . . 265 are supplied with the clock signal PLS. Therefore the flip-flops 261 . . . 265 are latched by the outputs of comparators 251 . . . 255 in response to the clocking of the clock signal PLS. An encoder 270 is coupled to the outputs of flip-flops 261 . . . 265 for generating the digital signals $N_n \ldots N_0$. FIG. 6 shows a waveform of the oscillation signal WAV. The digital signals $N_n \ldots N_0$ are produced in response to the oscillation signal WAV.

Figure 7:
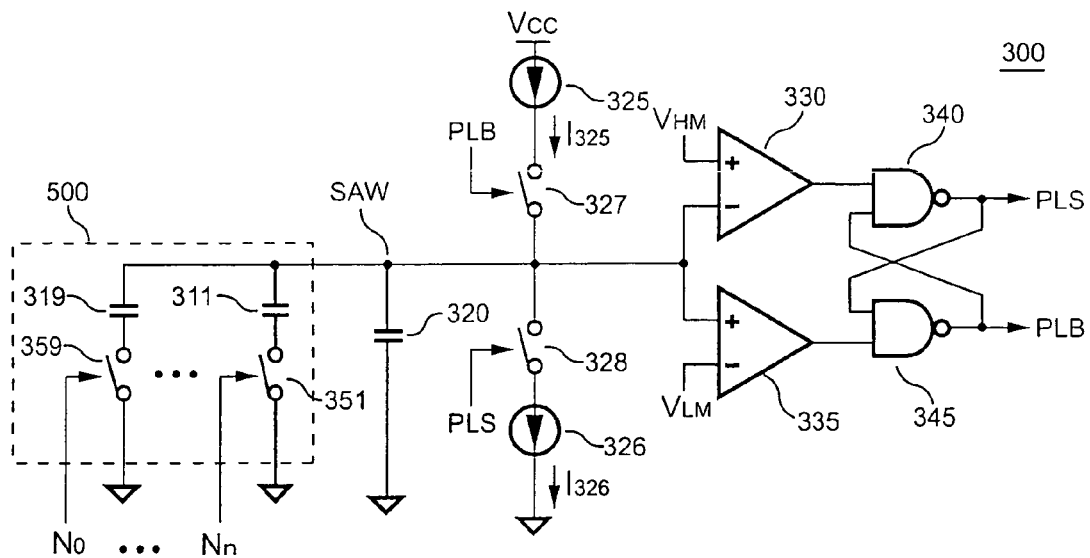
FIG. 7 shows a first oscillator according to an embodiment of the present invention.

FIG. 7 shows the first oscillator 300 according to an embodiment of the present invention. The first oscillator 300 comprises a charge-current source 325 for producing a charge current $I_{325}$. A discharge-current source 326 is used for producing a discharge current $I_{326}$. A capacitor 320 is connected in parallel with a programmable capacitor 500. The programmable capacitor comprises switching-capacitor couples connected to each other in parallel. The switching-capacitor couples are formed by capacitors 311 . . . 319 and switches 351 . . . 359 connected in series respectively. Switches 351 . . . 359 are turned on/off by the digital signals $N_n \ldots N_0$, respectively. Therefore, the capacitance of the programmable capacitor 500 is programmed by the digital signals $N_n \ldots N_0$ in order to modulate the switching frequency. A charge switch 327 is connected between the charge-current source 325 and the capacitor 320. A discharge switch 328 is connected between the discharge-current source 326 and the capacitor 320. A first comparator 330 having a first input is supplied with a first threshold voltage $V_{HM}$. A second input of the first comparator 330 is connected to the capacitor 310. A second comparator 335 having a second input is supplied with a second threshold voltage $V_{LM}$. A first input of the second comparator 335 is connected to the capacitor 320. The first threshold voltage $V_{HM}$ is higher than the second threshold voltage $V_{LM}$. A first gate 340 is used for producing the clock signal PLS for determining the switching frequency of the switching signal $V_{SW}$. A first input of the first gate 340 is driven by an output of the first comparator 330. An output of the first gate 340 turns on/off the discharge switch 328. A second gate 345 having two inputs are respectively connected to the output of the first gate 340 and an output of the second comparator 335. An output of the second gate 345 is connected to a second input of the first gate 340. The output of the second gate 345 turns on/off the charge switch 327. A ramp signal SAW is therefore generated across the capacitor 320.

Figure 8:
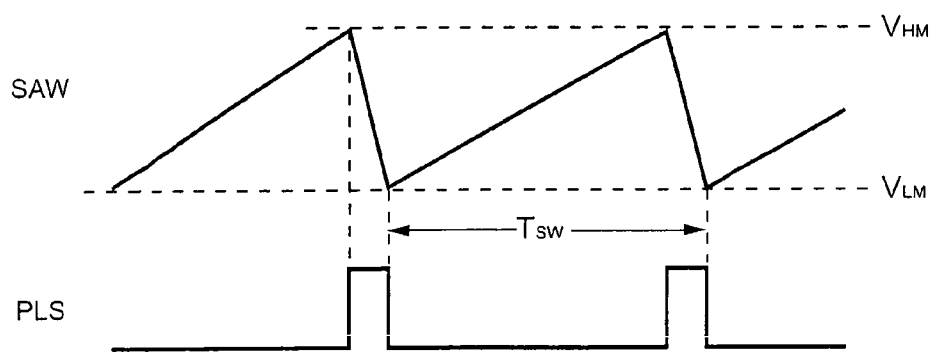
FIG. 8 shows various waveforms of the first oscillator.
Figure 9:
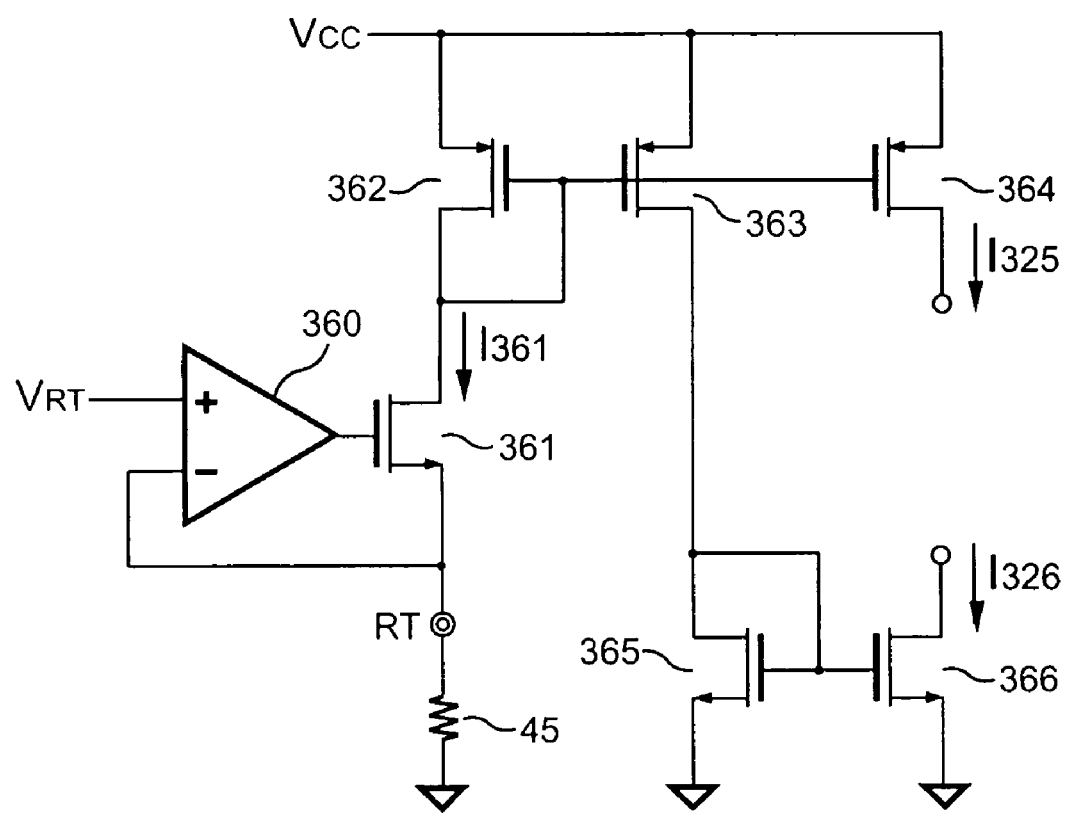
FIG. 9 shows a schematic circuit for setting the switching frequency.

FIG. 8 shows waveforms of the ramp signal SAW and the clock signal PLS. The frequency of the ramp signal SAW and the clock signal PLS is determined by the charge current $I_{325}$, the discharge current $I_{326}$, the capacitor 310 and the programmable capacitor 500. The charge current $I_{325}$ and the discharge current $I_{326}$ are generated by a circuit shown in FIG. 9. According to the applications, the resistor 45 is utilized to determine the switching frequency. The digital signals $N_n \ldots N_0$ is varied in response to the oscillation signal WAV of the second oscillator 200, which is separated from the switching frequency set by the first oscillator 300. When the programmable capacitor 500 is programmable by the digital signals $N_n \ldots N_0$, the switching frequency of the switching signal $V_{SW}$ is modulated accordingly. The spectrum of the switching energy is spread. The EMI of the power converter is therefore reduced. Refer to equation (2), the output power of the power converter is varied in response to the modulation of the switching period T. The digital signals $N_n \ldots N_0$ further control the attenuation rate of the feedback signal $V_{FB}$, which controls the on-time $T_{ON}$ of the switching signal $V_{SW}$. Consequently, offsets the variation caused by the switching frequency modulation, and keeps the output power and the output voltage as constant.

It will be apparent to those skilled in the art that various modifications and variations can be made to the structure of the present invention without departing from the scope or spirit of the invention. In view of the foregoing, it is intended that the present invention covers modifications and variations of this invention provided they fall within the scope of the following claims and their equivalents.

What is claimed is:

1. A control circuit having frequency modulation, comprising:
a switching circuit, coupled to a feedback circuit to generate a switching signal for regulating an output of a power converter; wherein said feedback circuit receives said output of said power converter for producing a feedback signal to control said switching signal;
a first oscillator, generating a clock signal to said switching circuit to determine a switching frequency of said switching signal;
a programmable capacitor, connected to said first oscillator for modulating a frequency of said clock signal;
a second oscillator, generating an oscillation signal, wherein an encoding circuit generates digital signals in response to said oscillation signal; and
a programmable resistor, coupled to said feedback circuit for attenuating said feedback signal;
wherein said digital signals control said programmable capacitor for modulating said switching frequency of said switching signal; and said digital signals control said programmable resistor for programming an attenuation rate of said feedback signal.

2. The control circuit of claim 1, wherein said programmable capacitor comprises:
switching-capacitor couples, connected to each other in parallel, wherein said switching-capacitor couples are formed by couples of switches and capacitors connected in series respectively, wherein said switches are turned on/off by said digital signals.

3. The control circuit of claim 1, wherein said programmable resistor comprises:
switching-resistor couples, connected to each other in parallel, wherein said switching-resistor couples are formed by couples of attenuator switches and attenuator resistors connected in series respectively, wherein said attenuator switches are turned on/off by said digital signals.

4. The control circuit of claim 1, wherein said first oscillator comprises:
a charge-current source, for producing a charge current;
a discharge-current source, for producing a discharge current;
an osc capacitor, connected in parallel with said programmable capacitor;
an osc-charge switch, connected between said charge-current source and said osc capacitor;
an osc-discharge switch, connected between said discharge-current source and said osc capacitor;
a first comparator, wherein a first input of said first comparator is supplied with a first osc-threshold voltage, a second input of said first comparator being connected to said osc capacitor;
a second comparator, wherein a second input of said second comparator is supplied with a second osc-threshold voltage, a first input of said second comparator being connected to said osc capacitor, wherein said first osc-threshold voltage is higher than said second osc-threshold voltage;
a first gate, for producing said clock signal for determining said switching frequency of said switching signal, wherein a first input of said first gate is driven by an output of said first comparator, an output of said first gate turning on/off said osc-discharge switch; and
a second gate, wherein two inputs of said second gate are respectively connected to said output of said first gate and an output of said second comparator, wherein an output of said second gate is connected to a second input of said first gate, said output of said second gate turning on/off said osc-charge switch.

5. The control circuit of claim 1, wherein said encoding circuit comprises:
a plurality of comparators, having positive inputs supplied with said oscillation signal; wherein negative inputs of said comparators are supplied with a plurality of threshold voltages respectively;
a plurality of flip-flops, having inputs coupled to outputs of said comparators respectively; wherein clock inputs of said flip-flops are supplied with said clock signal; and an encoder, coupled to outputs of said flip-flops for generating said digital signals.

6. A control circuit having frequency modulation, comprising:
- a switching circuit, coupled to a feedback circuit to generate a switching signal for regulating an output of a power converter; wherein said feedback circuit receives said output of said power converter for producing a feedback signal to control said switching signal;
- a first oscillator, coupled to said switching circuit to determine a switching frequency of said switching signal;
- a programmable capacitor, coupled to said first oscillator to modulate said switching frequency of said switching signal;
- a second oscillator, generating an oscillation signal, wherein an analog-to-digital converter generates digital signals in response to said oscillation signal; and
- a programmable resistor, coupled to said feedback circuit for attenuating said feedback signal; wherein said digital signals are coupled to control a capacitance of said programmable capacitor and a resistance of said programmable resistor.

7. The control circuit of claim 6, wherein said programmable capacitor comprises:
- switching-capacitor couples, connected to each other in parallel, wherein said switching-capacitor couples are formed by couples of switches and capacitors connected in series respectively, wherein said switches are turned on/off by said digital signals.

8. The control circuit of claim 6, wherein said programmable resistor comprises:
- switching-resistor couples, connected to each other in parallel, wherein said switching-resistor couples are formed by couples of attenuator switches and attenuator resistors connected in series respectively, wherein said attenuator switches are turned on/off by said digital signals.

9. The control circuit of claim 6, wherein said first oscillator comprises:
- a charge-current source, for producing a charge current;
- a discharge-current source, for producing a discharge current;
- an osc capacitor, connected in parallel with said programmable capacitor;
- an osc-charge switch, connected between said charge-current source and said osc capacitor;
- an osc-discharge switch, connected between said discharge-current source and said osc capacitor;
- a first comparator, wherein a first input of said first comparator is supplied with an first osc-threshold voltage, a second input of said first comparator being connected to said osc capacitor;
- a second comparator, wherein a second input of said second comparator is supplied with a second osc-threshold voltage, a first input of said second comparator is connected to said osc capacitor, wherein said first osc-threshold voltage is higher than said second osc-threshold voltage;
- a first gate, coupled to said switching circuit for determining said switching frequency of said switching signal, wherein a first input of said first gate is driven by an output of said first comparator, wherein an output of said first gate turns on/off said osc-discharge switch; and
- a second gate, wherein two inputs of said second gate are respectively connected to said output of said first gate and an output of said second comparator, wherein an output of said second gate is connected to a second input of said first gate, wherein said output of said second gate turns on/off said osc-charge switch.

10. The control circuit of claim 6, wherein said analog-to-digital converter comprises:
- a plurality of comparators, having positive inputs supplied with said oscillation signal; wherein negative inputs of said comparators are supplied with a plurality of threshold voltages respectively;
- a plurality of flip-flops, having inputs coupled to outputs of said comparators respectively; wherein clock inputs of said flip-flops are coupled to an output of said first oscillator; and
- an encoder, coupled to outputs of said flip-flops for generating said digital signals.

* * * * *